US011604318B2

(12) United States Patent
Xiong et al.

(10) Patent No.: US 11,604,318 B2
(45) Date of Patent: Mar. 14, 2023

(54) OPTICAL FIBER SUB-ASSEMBLY AND OPTICAL FIBER CONNECTOR

(71) Applicant: Huawei Technologies Co., Ltd., Shenzhen (CN)

(72) Inventors: Wei Xiong, Dongguan (CN); Xiupeng Li, Wuhan (CN); Jianxiong Yu, Wuhan (CN); Shangjun Peng, Wuhan (CN); Boyong He, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 101 days.

(21) Appl. No.: 17/183,938

(22) Filed: Feb. 24, 2021

(65) Prior Publication Data

US 2021/0181432 A1 Jun. 17, 2021

Related U.S. Application Data

(63) Continuation of application No. PCT/CN2020/103973, filed on Jul. 24, 2020.

(30) Foreign Application Priority Data

Jul. 26, 2019 (CN) .......................... 201910683577.X (51) Int. Cl.
*G02B 6/38* (2006.01)

(52) U.S. Cl.
CPC .................. *G02B 6/3849* (2013.01)

(58) Field of Classification Search
None
See application file for complete search history.

(56) References Cited

U.S. PATENT DOCUMENTS

| 5,052,774 A | 10/1991 | Bulman et al. |
| 5,214,732 A | 5/1993 | Beard et al. |
| 7,467,896 B2 | 12/2008 | Melton et al. |
| 7,621,675 B1 | 11/2009 | Bradley |
| 7,708,469 B2 | 5/2010 | Liu et al. |
| 2004/0047566 A1 | 3/2004 | McDonald et al. |

(Continued)

FOREIGN PATENT DOCUMENTS

| CN | 1561462 A | 1/2005 |
| CN | 1985205 A | 6/2007 |

(Continued)

OTHER PUBLICATIONS

Translation of CN109270639A (Year: 2019).*

*Primary Examiner* — Chad H Smith
(74) *Attorney, Agent, or Firm* — Conley Rose, P.C.

(57) ABSTRACT

An optical fiber sub-assembly includes: a handle, a rear retainer, an optical cable, a field mountable connector (FMC) assembly, a spindle, and a protection hood fixedly connected to the spindle. An end of the optical cable is connected to the FMC assembly, the optical cable protrudes from a first end of the FMC assembly. The FMC assembly includes a ferrule provided at a second end of the FMC assembly. The spindle is sleeved outside the first end of the FMC assembly, and the protection hood is sleeved outside the second end of the FMC assembly. An end of the spindle that is away from the protection hood is connected to the rear retainer and is used to fasten the optical cable. The handle is sleeved outside the protection hood and the spindle.

20 Claims, 8 Drawing Sheets

(56) References Cited

U.S. PATENT DOCUMENTS

| | | |
|---|---|---|
| 2005/0041928 A1 | 2/2005 | Zimmel et al. |
| 2005/0281510 A1 | 12/2005 | Vo et al. |
| 2008/0175541 A1 | 7/2008 | Lu et al. |
| 2008/0175542 A1 | 7/2008 | Lu et al. |
| 2008/0175546 A1* | 7/2008 | Lu .................. G02B 6/3851 385/92 |
| 2008/0310796 A1 | 12/2008 | Lu |
| 2009/0148103 A1 | 6/2009 | Lu et al. |
| 2009/0148104 A1 | 6/2009 | Lu et al. |
| 2011/0280521 A1 | 11/2011 | Kachmar |
| 2015/0063756 A1 | 3/2015 | Hallett et al. |
| 2015/0177467 A1 | 6/2015 | Gniadek et al. |
| 2015/0241639 A1 | 8/2015 | Lu et al. |
| 2015/0260926 A1 | 9/2015 | Wu et al. |
| 2016/0356964 A1 | 12/2016 | Liu et al. |
| 2017/0153398 A1 | 6/2017 | Compton et al. |
| 2017/0299817 A1* | 10/2017 | Huang .................. G02B 6/36 |
| 2018/0081125 A1* | 3/2018 | Huang .................. G02B 6/3893 |
| 2020/0363593 A1 | 11/2020 | Xiong et al. |
| 2021/0181432 A1 | 6/2021 | Xiong et al. |

FOREIGN PATENT DOCUMENTS

| | | | | |
|---|---|---|---|---|
| CN | 101806940 A | 8/2010 | | |
| CN | 101589320 B | 9/2011 | | |
| CN | 102066999 B | 5/2013 | | |
| CN | 103135171 A | 6/2013 | | |
| CN | 202975395 U | 6/2013 | | |
| CN | 101939680 B | 7/2013 | | |
| CN | 203178525 U | 9/2013 | | |
| CN | 104662459 A | 5/2015 | | |
| CN | 104849816 A | 8/2015 | | |
| CN | 104965262 A | 10/2015 | | |
| CN | 103278890 B | 4/2016 | | |
| CN | 205691817 U | 11/2016 | | |
| CN | 105339822 B | 10/2017 | | |
| CN | 107656339 A | 2/2018 | | |
| CN | 207965231 U | 10/2018 | | |
| CN | 109188611 A | 1/2019 | | |
| CN | 109270639 A | * | 1/2019 | ............. G02B 6/381 |
| CN | 208459637 U | 2/2019 | | |
| CN | 208488569 U | 2/2019 | | |
| CN | 109521532 A | 3/2019 | | |
| CN | 110542952 A | 12/2019 | | |
| EP | 2772778 B1 | 1/2016 | | |
| JP | 2010191420 A | 9/2010 | | |
| JP | 2017504843 A | 2/2017 | | |
| JP | 2017194702 A | 10/2017 | | |
| JP | 2018040820 A | 3/2018 | | |
| KR | 100942230 B1 | 2/2010 | | |
| WO | 9412901 A1 | 6/1994 | | |
| WO | 2006105034 A1 | 10/2006 | | |
| WO | 2008021351 A2 | 2/2008 | | |
| WO | 2009131993 A1 | 10/2009 | | |
| WO | 2010118031 A1 | 10/2010 | | |
| WO | 2013077969 A1 | 5/2013 | | |
| WO | 2013177016 A1 | 11/2013 | | |
| WO | 2014206976 A1 | 12/2014 | | |
| WO | 2016005879 A1 | 1/2016 | | |
| WO | 2016036692 A1 | 3/2016 | | |
| WO | 2016085839 A1 | 6/2016 | | |
| WO | 2016095213 A1 | 6/2016 | | |

\* cited by examiner

OPTICAL FIBER SUB-ASSEMBLY AND OPTICAL FIBER CONNECTOR

CROSS-REFERENCE TO RELATED APPLICATIONS

This application is a continuation of International Patent Application No. PCT/CN2020/103973, filed on Jul. 24, 2020, which claims priority to Chinese Patent Application No. 201910683577.X, filed on Jul. 26, 2019. The disclosures of the aforementioned applications are hereby incorporated by reference in their entireties.

TECHNICAL FIELD

This application relates to the field of optical communications technologies, and in particular, to an optical fiber sub-assembly and an optical fiber connector.

BACKGROUND

With development of modern society and explosive growth of information, people pose an increasingly high requirement to a network throughput capability. Optical transmission, with its unique features such as ultra-high bandwidth and low electromagnetic interference, gradually becomes a mainstream solution for modern communications. Particularly, new networks built in a current stage, such as access networks represented by fiber to the home (FTTH), are being deployed on a large scale.

In construction of a fiber to the home network, a feeder optical cable, a distribution optical cable, and a drop cable need to be routed in sequence between an optical line terminal (OLT) and an access terminal box (ATB) of a user. The drop cable is used to connect a fiber distribution box to the access terminal box. During layout of the drop cable of the FTTH network, a method is splicing. To be specific, an optical fiber terminal corresponding to each household is allocated in the fiber distribution box, the optical fiber terminal of each household and the drop cable are spliced in the fiber distribution box through an optical fiber splicer, and then the drop cable is routed to each household. At the other end of the drop cable, onsite splicing also needs to be performed to connect the drop cable to an access terminal box of each household. A problem resulting from this method is that a dedicated optical fiber splicing device is required, thereby posing a comparatively high requirement to technical skills of an operator, and making an operation process complicated and inconvenient.

SUMMARY

Embodiments of this application provide an optical fiber sub-assembly and an optical fiber connector, such that the optical fiber sub-assembly is convenient for plug-and-play with an adapter outdoors, and an operation is simple, fast, safe, and reliable.

According to a first aspect, an embodiment of this application provides an optical fiber sub-assembly, including a handle, a rear retainer, an optical cable, a field-mountable connector (FMC) assembly, a spindle, and a protection hood. An end of the optical cable is connected to the FMC assembly, and the optical cable protrudes from a first end of the FMC assembly. The FMC assembly includes a ferrule, and the ferrule is provided at a second end of the FMC assembly. The spindle is sleeved outside the first end of the FMC assembly, the protection hood is sleeved outside the second end of the FMC assembly, and the protection hood is fixedly connected to the spindle. An end that is of the spindle and that is away from the protection hood is connected to the rear retainer, and the end that is of the spindle and that is away from the protection hood is used to fasten the optical cable. The handle is sleeved outside the protection hood and the spindle.

In this implementation, in the optical fiber sub-assembly in this embodiment of this application, the optical cable is connected using the FMC assembly. Therefore, an optical cable of a required length may be obtained by assembly personnel through flexible cutting based on an optical cable length that is required by a customer or required at an assembly site. A trimmed optical cable terminal may be assembled at the assembly site. For example, the FMC assembly may be first assembled, and then the handle, the rear retainer, the spindle, the protection hood, and the like are assembled with the FMC assembly, to assemble the optical fiber sub-assembly on site. It can be learned that a length of the optical cable of the optical fiber sub-assembly in this embodiment may be flexibly set at a construction site, thereby helping save the optical cable and implementing convenient and fast assembly. In addition, the spindle, the protection hood, the handle, and the rear retainer are sleeved outside the FMC assembly to assemble the optical fiber sub-assembly, such that the FMC assembly can be protected to meet an IP68 protection class. The FMC assembly is effectively protected, such that the optical fiber sub-assembly is convenient for plug-and-play with an adapter outdoors, and an operation is simple, fast, safe, and reliable. In addition, because the optical fiber sub-assembly using the FMC assembly can be assembled and disassembled on site, if the ferrule or the FMC assembly is damaged during use, only the FMC assembly needs to be replaced, without replacing the entire optical fiber sub-assembly that includes the optical cable, thereby greatly reducing subsequent maintenance expenses and reducing costs.

Optionally, in some possible implementations, the protection hood includes a hood body and a fixing sleeve formed by extending an end of the hood body. The fixing sleeve is inserted in the spindle, the FMC assembly penetrates the fixing sleeve and the hood body, and the hood body is sleeved outside the ferrule. In this implementation, the hood body is sleeved outside the ferrule to protect the ferrule. When the optical fiber sub-assembly is assembled on site, the fixing sleeve is inserted in the spindle, such that the protection hood can be quickly located. This helps quickly align an axis of the protection hood with an axis of the spindle, thereby implementing quick assembly.

Optionally, in some possible implementations, an inner wall at the end that is of the spindle and that is away from the protection hood has a shaft shoulder, and the first end of the FMC assembly presses against the shaft shoulder. This can prevent the FMC assembly from sliding along an axial direction of the spindle in a direction away from the protection hood.

Optionally, in some possible implementations, the end that is of the spindle and that is away from the protection hood includes a fixed portion and a crimping structure formed by extending an end face of the fixed portion. The fixed portion and the crimping structure are sleeved outside the optical cable. An outer wall of the fixed portion has an outer screw thread. An inner wall of the rear retainer is provided with an inner screw thread. The rear retainer is sleeved outside the fixed portion and the crimping structure, and the inner screw thread on the rear retainer is screwed to the outer screw thread on the fixed portion, such that the crimping structure fastens the optical cable. In this embodiment, the optical cable is connected to the FMC assembly, and the optical cable is tightly pressed by the crimping structure on the spindle, such that the FMC assembly can be further prevented from moving forward and backward in the spindle along the axial direction of the spindle.

Optionally, in some possible implementations, the crimping structure includes at least two cantilevers. Fixed ends of the at least two cantilevers are connected to the fixed portion. Bump structures are formed on inner walls of movable ends of the at least two cantilevers. The movable ends of the at least two cantilevers are used to tightly press the optical cable. In this implementation, an implementation of the crimping structure is provided, thereby improving practicability of this solution. In addition, the bump structures can improve tensile performance of the optical cable.

Optionally, in some possible implementations, an outer diameter of the fixing sleeve is less than an outer diameter of the hood body, such that the fixing sleeve can be conveniently inserted in the spindle. In addition, a fixing structure may be provided in a region on an end face that is of the hood body and that is close to the fixing sleeve, to fixedly connect to the spindle.

Optionally, in some possible implementations, a first fixing structure is provided on the spindle, a second fixing structure is provided on the protection hood, and the first fixing structure and the second fixing structure are fixedly connected through buckling, to prevent the protection hood from moving forward and backward along the axial direction of the spindle. In addition, the spindle and the protection hood are fixedly connected through buckling, such that the optical fiber sub-assembly can be assembled and disassembled more conveniently. Compared with a threaded connection, this can greatly shorten a time of assembling and disassembling the optical fiber sub-assembly on site.

Optionally, in some possible implementations, the first fixing structure is a snap clip, and the second fixing structure is a snap slot; or the first fixing structure is a snap slot, and the second fixing structure is a snap clip. In this implementation, an implementation of the first fixing structure and the second fixing structure is provided, thereby improving implementability of this solution.

Optionally, in some possible implementations, the first fixing structure is a snap clip provided on an end face that is of the spindle and that faces the protection hood, and the second fixing structure is a snap slot provided on the end face that is of the hood body and that is close to the fixing sleeve. In this implementation, the snap clip and the snap slot are provided on the end face of the spindle and the end face the hood body respectively, such that the snap clip and the snap slot are snap-fitted, and space is more compact.

Optionally, in some possible implementations, the optical fiber sub-assembly further includes a pin, the first fixing structure is a first jack, the second fixing structure is a second jack, and the pin is configured to be inserted in the first jack and the second jack. In this implementation, another implementation of fixing the spindle to the protection hood is provided, thereby improving scalability of this solution.

Optionally, in some possible implementations, the optical fiber sub-assembly further includes a snap spring, the first fixing structure is a first groove, the second fixing structure is a second groove, and the snap spring is configured to be inserted in the first groove and the second groove. In this implementation, another implementation of fixing the spindle to the protection hood is provided, thereby further improving scalability of this solution.

Optionally, in some possible implementations, the end face that is of the spindle and that faces the protection hood is bonded, using glue, to the end face that is of the hood body and that is close to the fixing sleeve. In this implementation, in addition to disposing the first fixing structure and the second fixing structure, the protection hood and the spindle may be alternatively directly fixed using glue, thereby improving flexibility of this solution.

Optionally, in some possible implementations, a locating key is provided on the end face that is of the spindle and that faces the protection hood, and a locating slot is provided on the end face that is of the hood body and that is close to the fixing sleeve; or a locating slot is provided on the end face that is of the spindle and that faces the protection hood, and a locating key is provided on the end face that is of the hood body and that is close to the fixing sleeve. The locating key is inserted in the locating slot. In this implementation, the fixing sleeve can be prevented from rotating in the spindle after the fixing sleeve is inserted in the spindle, thereby further preventing the fixing sleeve from sliding into the spindle.

Optionally, in some possible implementations, an inner cavity of the fixing sleeve matches the FMC assembly, to prevent the fixing sleeve from rotating relative to the FMC assembly.

Optionally, in some possible implementations, an opening is provided at an end that is of the protection hood and that is away from the spindle, such that a cross section of the end that is of the protection hood and that is away from the spindle is C-shaped, and the opening may be horn-shaped, that is, an end of the opening has an arc surface, which implements a guiding effect, helping guide insertion of the optical fiber sub-assembly in the adapter.

Optionally, in some possible implementations, an optical cable sealing ring is provided outside an end that is of the optical cable and that is close to the FMC assembly, to prevent external foreign matter, moisture, dust, and the like from entering the optical fiber sub-assembly through a gap between the optical cable and the rear retainer or the spindle; and a spindle sealing ring is provided outside an end that is of the spindle and that is close to the protection hood, to prevent external foreign matter, moisture, dust, and the like from entering the optical fiber sub-assembly through a gap between the handle and the spindle, thereby improving sealing performance of the optical fiber sub-assembly.

Optionally, in some possible implementations, the optical fiber sub-assembly further includes a dustproof cap, and the dustproof cap is connected to an end that is of the handle and that is away from the rear retainer. The dustproof cap can prevent dust and water and protect the FMC assembly before the optical fiber sub-assembly is inserted in the adapter.

Optionally, in some possible implementations, a protruding locking structure is provided on an inner wall at the end that is of the handle and that is away from the rear retainer, a locking groove is provided on an outer surface of an end of the dustproof cap, the locking structure is configured to snap-fit the locking groove, and a dustproof cap sealing ring is provided outside an end that is of the dustproof cap and that is close to the handle. The locking structure and the locking groove are snap-fitted, such that the handle and the dustproof cap can be fixed. The dustproof cap sealing ring implements a good sealing effect when the dustproof and the handle are snap-fitted.

Optionally, in some possible implementations, an indication identifier is provided on an outer surface at the end that is of the handle and that is away from the rear retainer, and is used to indicate a connected state or a released state of the handle. This helps visually learn about a connection status of the optical fiber sub-assembly during onsite assembly.

Optionally, in some possible implementations, two symmetric cutting planes are formed on an outer surface at an end that is of the handle and that is close to the rear retainer, and grooves are formed on the cutting planes. When an operation is performed to fix the handle to the dustproof cap, the cutting planes may be clamped for performing a rotation operation, to prevent slipping. The grooves can further increase friction to improve a hand feel of performing an operation.

According to a second aspect, an embodiment of this application provides an optical fiber connector, including an adapter and the optical fiber sub-assembly according to any implementation of the first aspect. A cavity and a slot surrounding the cavity are provided at an end of the adapter. An FMC assembly of the optical fiber sub-assembly is inserted in the cavity of the adapter. A protection hood of the optical fiber sub-assembly is inserted in the slot.

Optionally, in some possible implementations, a chute is provided on an outer surface at an end of the adapter, a protruding locking structure is provided on an inner wall at an end, away from a rear retainer, of the handle of the optical fiber sub-assembly, and the locking structure is slidably connected to the chute.

It can be learned from the foregoing technical solutions that the embodiments of this application have the following advantages.

In the optical fiber sub-assembly in the embodiments of this application, the optical cable is connected using the FMC assembly. Therefore, an optical cable of a required length may be obtained by assembly personnel through flexible cutting based on an optical cable length that is required by a customer or required at an assembly site. A trimmed optical cable terminal may be assembled at the assembly site. For example, the FMC assembly may be first assembled, and then the handle, the rear retainer, the spindle, the protection hood, and the like are assembled with the FMC assembly, to assemble the optical fiber sub-assembly on site. It can be learned that a length of the optical cable of the optical fiber sub-assembly in this embodiment may be flexibly set at a construction site, thereby helping save the optical cable and implementing convenient and fast assembly. In addition, the spindle, the protection hood, the handle, and the rear retainer are sleeved outside the FMC assembly to assemble the optical fiber sub-assembly, such that the FMC assembly can be protected to meet an IP68 protection class. The FMC assembly is effectively protected, such that the optical fiber sub-assembly is convenient for plug-and-play with the adapter outdoors, and an operation is simple, fast, safe, and reliable. In addition, because the optical fiber sub-assembly using the FMC assembly can be assembled and disassembled on site, if the ferrule or the FMC assembly is damaged during use, only the FMC assembly needs to be replaced, without replacing the entire optical fiber sub-assembly that includes the optical cable, thereby greatly reducing subsequent maintenance expenses and reducing costs.

DESCRIPTION OF EMBODIMENTS

Embodiments of this application provide an optical fiber sub-assembly and an optical fiber connector. The optical fiber sub-assembly may be assembled on site for plug-and-play. In addition, a length of an optical cable of the optical fiber sub-assembly may be flexibly set at a construction site, thereby helping save the optical cable and implementing convenient and fast assembly.

The following clearly and completely describes the technical solutions in the embodiments of the present disclosure with reference to the accompanying drawings in the embodiments of the present disclosure. It is clear that the described embodiments are merely some but not all embodiments of the present disclosure. All other embodiments obtained by a person of ordinary skill in the art based on the embodiments of the present disclosure without creative efforts shall fall within the protection scope of the present disclosure.

Figure 1:
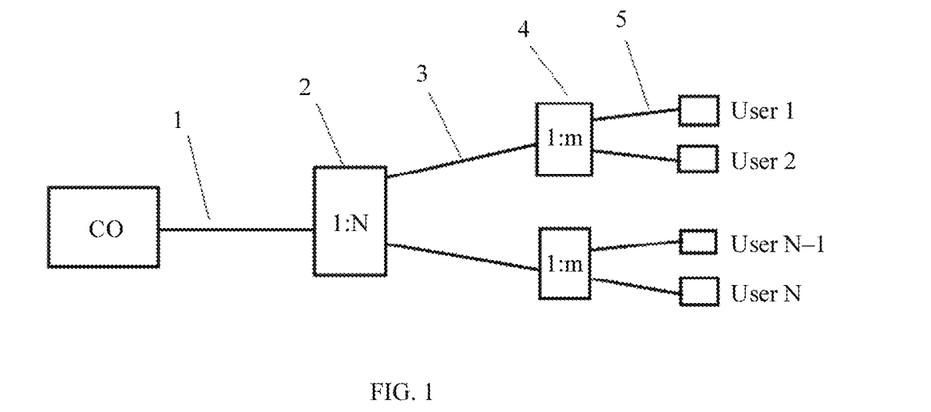
FIG. 1 is an architectural diagram of a network to which this application is applied.

FIG. 1 shows a part of a fiber to the x (FTTx) optical network. FTTx may be FTTH, fiber to the curb (FTTC), fiber to the premises (FTTP), fiber to the node or neighborhood (FTTN), fiber to the office (FTTO), or fiber to the service area (FTTSA). Using an FTTH network as an example, from a perspective of a downstream of a center office (CO), FTTH includes a feeder link 1, a 1:N splitter 2, a distribution link 3, a 1:m splitter 4, and at least one branch link 5. In this application, an optical fiber connector applied to an outdoor environment is applicable to the branch link 5. Although a type of network with an FTTx structure is used as an example in this application, another network structure is also applicable.

Figure 2:
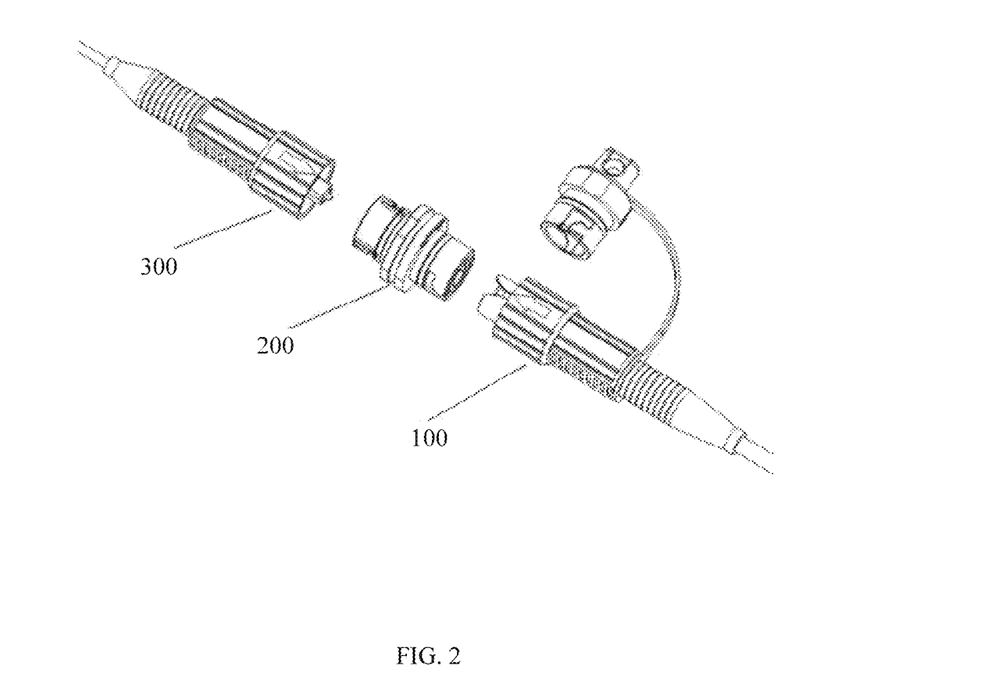
FIG. 2 is a schematic structural diagram of an optical fiber connector according to this application.

FIG. 2 shows an optical fiber connector 10 in this application. As shown in FIG. 2, the optical fiber connector 10 includes an optical fiber sub-assembly 100, an optical fiber sub-assembly 300, and an optical fiber adapter 200. The optical fiber sub-assembly 100 is connected to the other optical fiber sub-assembly 300 using the optical fiber adapter 200, to implement interconnection of internal optical fibers.

Figure 3:
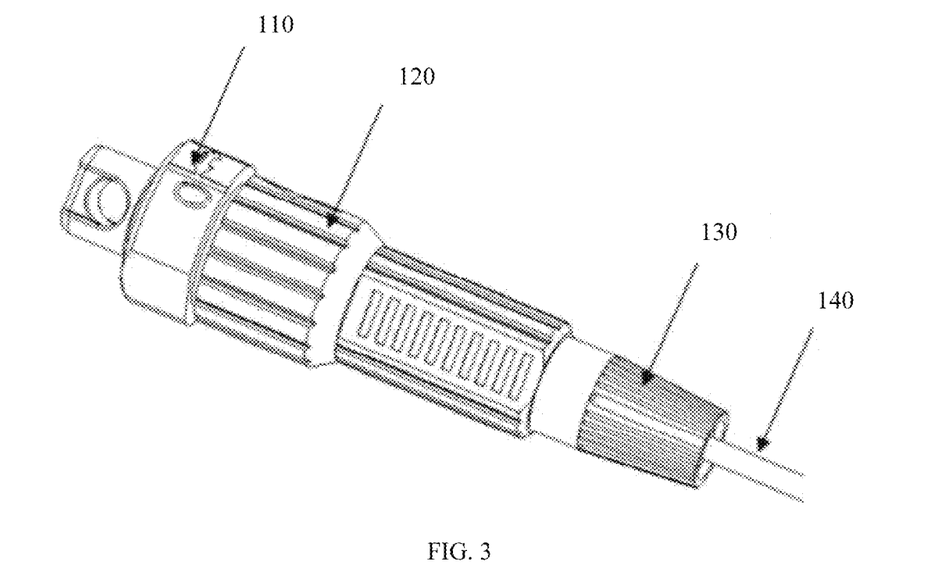
FIG. 3 is a schematic diagram of an external structure of an optical fiber sub-assembly according to this application.

FIG. 3 is a schematic diagram of an external structure of the optical fiber sub-assembly 100. From a perspective of an overall external appearance of the optical fiber sub-assembly 100, the optical fiber sub-assembly 100 includes a dustproof cap 110, a handle 120, a rear retainer 130, and an optical cable 140.

Figure 4:
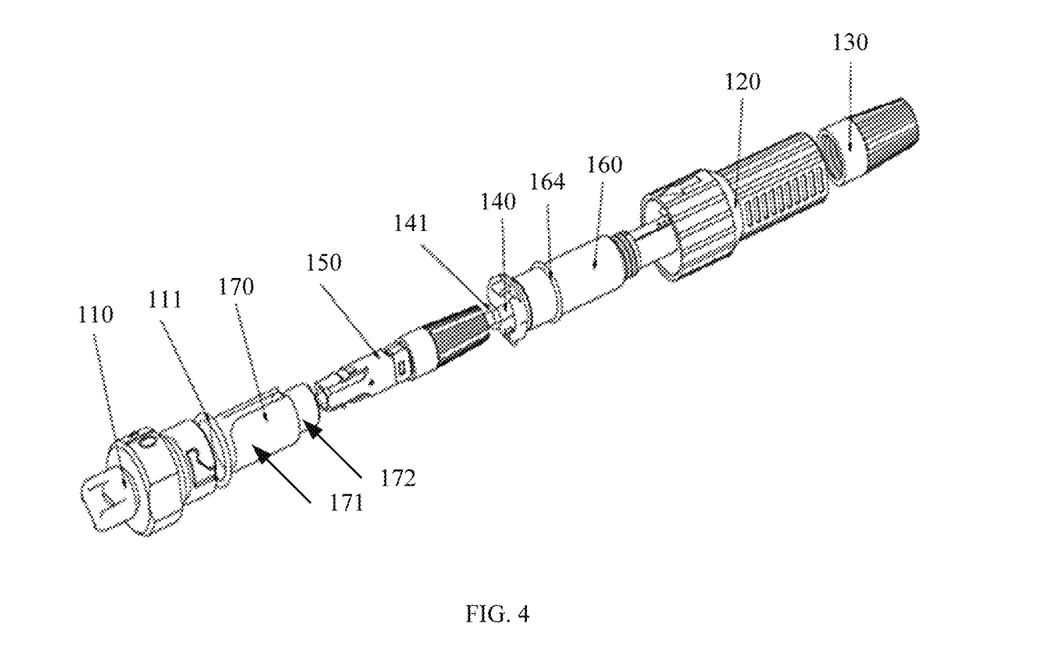
FIG. 4 is an exploded view of an optical fiber sub-assembly according to this application.

FIG. 4 is an exploded view of the optical fiber sub-assembly 100. It can be learned from an internal structure that the optical fiber sub-assembly 100 further includes a field mountable connector (FMC) assembly 150, a spindle 160, and a protection hood 170. The handle 120 and the rear retainer 130 are sleeved outside the spindle 160 and the protection hood 170. Further, the spindle 160 and the protection hood 170 are sleeved outside the FMC assembly 150.

Figure 5:
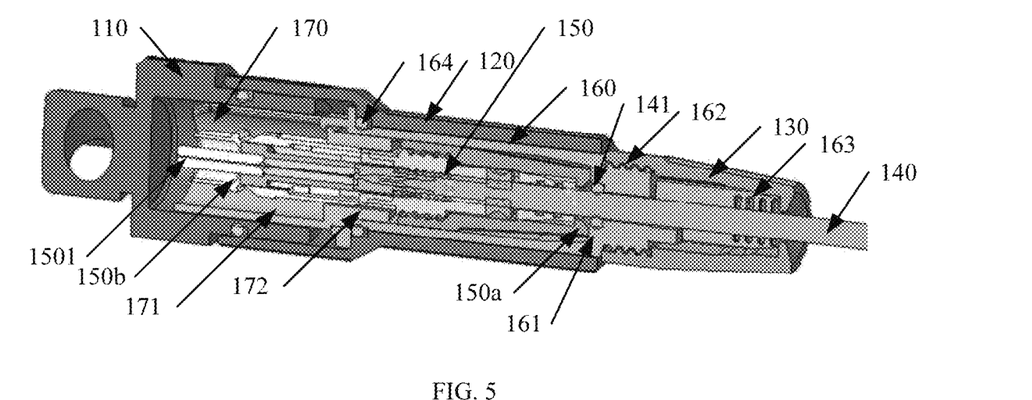
FIG. 5 is a sectional view of an optical fiber sub-assembly according to this application.

FIG. 5 is a sectional view of the optical fiber sub-assembly 100. An end of the optical cable 140 is connected to an end of the FMC assembly 150, and the optical cable 140 protrudes from a first end 150a of the FMC assembly 150. The FMC assembly 150 includes a ferrule 1501, and the ferrule 1501 is provided at a second end 150b of the FMC assembly 150. The spindle 160 is sleeved outside the first end 150a of the FMC assembly 150, the protection hood 170 is sleeved outside the second end 150b of the FMC assembly 150, and the spindle 160 is fixedly connected to the protection hood 170. The handle 120 is sleeved outside the spindle 160 and the protection hood 170. The rear retainer 130 is connected to an end that is of the spindle 160 and that is away from the protection hood 170, and the end that is of the spindle 160 and that is away from the protection hood 170 is used to fasten the optical cable 140.

Figure 6A:
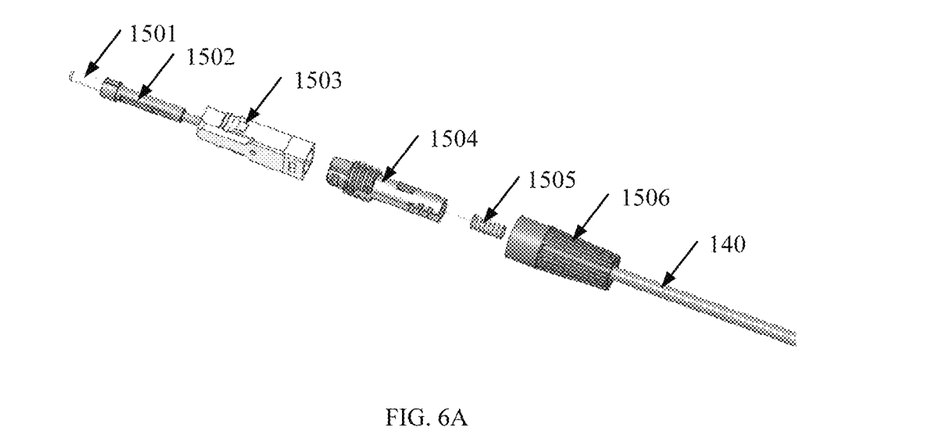
FIG. 6A is an exploded view of an FMC assembly according to this application.
Figure 6B:
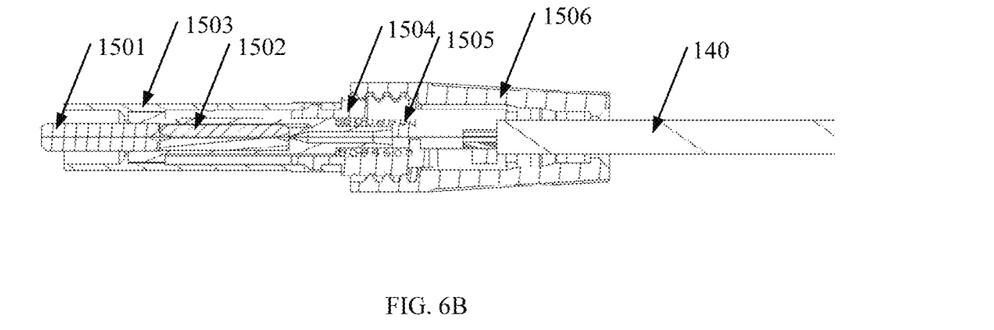
FIG. 6B is a sectional view of an FMC assembly according to this application.

Referring to an exploded view of the FMC assembly in FIG. 6A and a sectional view of the FMC assembly in FIG. 6B, the FMC assembly 150 may include the ferrule 1501, a ferrule fixing portion 1502, an outer frame sleeve 1503, a base 1504, a spring 1505, and an FMC rear retainer 1506. The optical cable 140 is connected to the base 1504 and is stripped into an optical fiber. Then the optical fiber is led through the ferrule fixing portion 1502 and is connected to the ferrule 1501. The ferrule fixing portion 1502 is configured to fix the ferrule 1501 and protect the optical fiber. The outer frame sleeve 1503 is sleeved outside the ferrule 1501 and the ferrule fixing portion 1502. The outer frame sleeve 1503 is fixedly connected to an end that is of the base 1504 and that is close to the ferrule 1501. An end that is of the base 1504 and that is away from the ferrule 1501 is screwed to the FMC rear retainer 1506 through a screw thread. The spring 1505 is fixed to an inner wall of the base 1504. An end that is of the spring 1505 and that is close to the ferrule 1501 presses against the ferrule fixing portion 1502, to provide support for the ferrule 1501 and the ferrule fixing portion 1502, and make the ferrule 1501 flexible.

For example, when performing assembly on site, an operator may first obtain, through cutting, an optical cable 140 of any length according to an actual requirement; then sequentially connect the optical cable 140 to the base 1504, the ferrule fixing portion 1502, and the ferrule 1501; then sleeve the outer frame sleeve 1503 outside the ferrule 1501 and the ferrule fixing portion 1502, and fix the outer frame sleeve 1503 to the base 1504; then sleeve the FMC rear retainer 1506 outside the base 1504, and screw the FMC rear retainer 1506 to the base 1504 through a screw thread, to complete assembly for connecting the optical cable 140 to the FMC assembly 150; and then sleeve the spindle 160, the protection hood 170, the handle 120, and the rear retainer 130 outside the FMC assembly 150, to complete assembly of the optical fiber sub-assembly 100. It should be noted that the optical cable 140 in this application may include various types of cables such as a butterfly cable, a round cable, and a flat cable. This is not specifically limited herein.

In an embodiment, the protection hood 170 includes a hood body 171 and a fixing sleeve 172 formed by extending an end of the hood body 171. The fixing sleeve 172 is inserted in the spindle 160, and the hood body 171 is sleeved outside the ferrule 1501 to protect the ferrule 1501. When the optical fiber sub-assembly 100 is assembled on site, the fixing sleeve 172 is inserted in the spindle 160, such that the protection hood 170 can be quickly located. This helps quickly align an axis of the protection hood 170 with an axis of the spindle 160, thereby implementing quick assembly. A cavity in the fixing sleeve 172 may match the outer frame sleeve 1503 of the FMC assembly 150. For example, a cross section of the cavity in the fixing sleeve 172 may be a square, a cross section of the outer frame sleeve 1503 of the FMC assembly 150 may also be a square, and sizes of the two cross sections match, thereby preventing the fixing sleeve 172 from rotating relative to the FMC assembly 150.

On the contrary, for an outdoor optical fiber sub-assembly that cannot be assembled on site as in other approaches, an optical cable length of the outdoor optical fiber sub-assembly is fixed before delivery, and cannot be changed at a construction site. For example, a manufacturer usually produces optical fiber sub-assemblies of various specifications, for example, specifications of optical cable lengths of the optical fiber sub-assemblies are 50 meters, 100 meters, 200 meters, and the like. If only a 60-meter-long optical cable is required on site, an optical fiber sub-assembly with a 100-meter-long optical cable still needs to be provided for a customer during construction, thereby inevitably wasting a 40-m optical cable.

In the optical fiber sub-assembly 100 in this embodiment of this application, the optical cable 140 is connected using the FMC assembly 150. Therefore, an optical cable of a required length may be obtained by assembly personnel through flexible cutting based on an optical cable length that is required by a customer or required at an assembly site. A trimmed optical cable terminal may be assembled at the assembly site. For example, the FMC assembly 150 may be first assembled, and then the handle 120, the rear retainer 130, the spindle 160, the protection hood 170, and the like are assembled with the FMC assembly 150, to assemble the optical fiber sub-assembly 100 on site. It can be learned that a length of the optical cable of the optical fiber sub-assembly 100 in this embodiment may be flexibly set at a construction site, thereby helping save the optical cable and implementing convenient and fast assembly. In addition, the spindle 160, the protection hood 170, the handle 120, and the rear retainer 130 are sleeved outside the FMC assembly 150 to assemble the optical fiber sub-assembly 100, such that the FMC assembly 150 can be protected to meet an IP68 protection class. The FMC assembly 150 is effectively protected, such that the optical fiber sub-assembly 100 is convenient for plug-and-play with the adapter 200 outdoors, and an operation is simple, fast, safe, and reliable. In addition, because the optical fiber sub-assembly using the FMC assembly can be assembled and disassembled on site, if the ferrule or the FMC assembly is damaged during use, only the FMC assembly needs to be replaced, without replacing the entire optical fiber sub-assembly that includes the optical cable, thereby greatly reducing subsequent maintenance expenses and reducing costs.

Referring to FIG. 4 and FIG. 5, in an embodiment, an optical cable sealing ring 141 is provided outside an end that is of the optical cable 140 and that is close to the FMC assembly 150, to prevent external foreign matter, moisture, dust, and the like from entering the optical fiber sub-assembly 100 through a gap between the optical cable 140 and the rear retainer 130 or the spindle 160.

In an embodiment, a spindle sealing ring 164 is provided outside an end that is of the spindle 160 and that is close to the protection hood 170, to prevent external foreign matter, moisture, dust, and the like from entering the optical fiber sub-assembly 100 through a gap between the handle 120 and the spindle 160, thereby improving sealing performance of the optical fiber sub-assembly 100.

In an embodiment, an inner wall at the end that is of the spindle 160 and that is away from the protection hood 170 has a shaft shoulder 161, and the shaft shoulder 161 presses against the first end 150a of the FMC assembly 150. This can prevent the FMC assembly 150 from sliding along an axial direction of the spindle 160 in a direction away from the protection hood 170, thereby limiting the FMC assembly 150.

In an embodiment, the end that is of the spindle 160 and that is away from the protection hood 170 includes a fixed portion 162 and a crimping structure 163 formed by extending an end face of the fixed portion 162. The fixed portion 162 and the crimping structure 163 are sleeved outside the optical cable 140. An outer wall of the fixed portion 162 has an outer screw thread. An inner wall of the rear retainer 130 is provided with an inner screw thread. The rear retainer 130 is sleeved outside the fixed portion 162 and the crimping structure 163, and the inner screw thread on the rear retainer 130 is screwed to the outer screw thread on the fixed portion 162, such that the crimping structure 163 fastens the optical cable 140.

Figure 7:
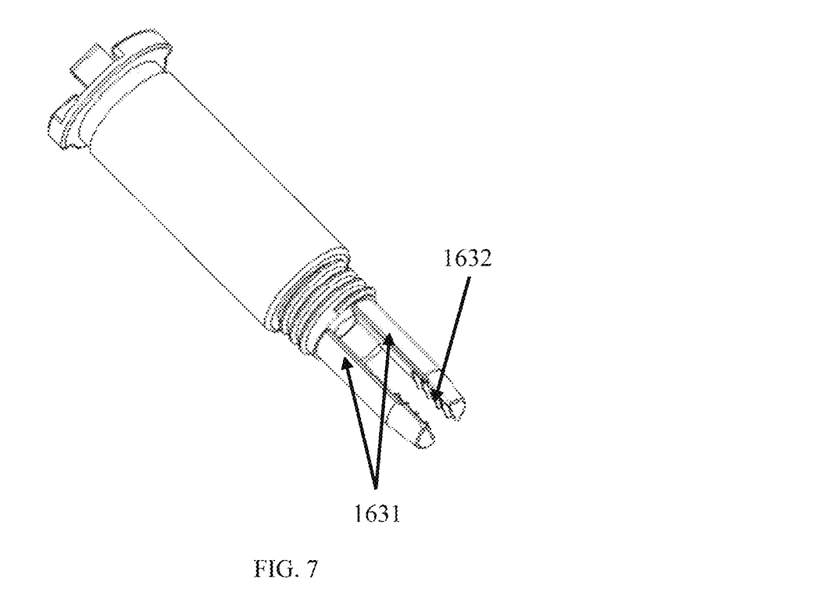
FIG. 7 is a schematic diagram of a crimping structure on a spindle according to this application.

Referring to FIG. 7, in an embodiment, the crimping structure 163 may include two cantilevers 1631. Fixed ends of the two cantilevers 1631 are connected to the fixed portion 162. Bump structures 1632 are provided on inner walls of movable ends of the two cantilevers 1631. A quantity of bump structures 1632 is not specifically limited herein. An inner cavity of the rear retainer 130 may be slightly smaller than a periphery formed by the two cantilevers 1631 in a natural state. Further, in a process in which the inner screw thread on the rear retainer 130 is screwed to the outer screw thread on the fixed portion 162, the movable ends of the two cantilevers 1631 are tightly pressed and squeezed in a direction toward the optical cable 140 to clamp the optical cable 140. The bump structures 1632 can improve tensile performance of the optical cable 140. The optical cable 140 is connected to the FMC assembly 150, and the optical cable 140 is tightly pressed by the crimping structure 163 on the spindle 160, such that the FMC assembly 150 can be prevented from moving forward and backward in the spindle 160 along the axial direction of the spindle 160. It should be noted that the crimping structure 163 may include more cantilevers 1631, for example, three or four cantilevers. This is not specifically limited herein. In another embodiment, the crimping structure 163 may be alternatively a cylindrical structure, and the cylindrical structure is made of an elastic material. An inner cavity of the rear retainer 130 may be slightly smaller than a periphery of the cylindrical structure. Further, in a process in which the inner screw thread on the rear retainer 130 is screwed to the outer screw thread on the fixed portion 162, the rear retainer 130 presses against the elastic crimping structure 163 to fasten the optical cable 140.

In an embodiment, the handle 120 is a cylindrical structure that has a stepped surface inside. The stepped surface inside the handle 120 presses against the end that is of the spindle 160 and that is close to the protection hood 170, to prevent the handle 120 from sliding in a direction away from the rear retainer 130. After the rear retainer 130 is screwed to the fixed portion 162, the rear retainer 130 may press against the handle 120, to prevent the handle 120 from sliding in a direction toward the rear retainer 130. In addition to the aforementioned manners, there may be alternatively another manner of fixing the handle 120. For example, a chute is provided on an outer surface of the spindle 160, a flange is provided on an inner surface of the handle 120, and the handle may be rotated to snap-fit the flange and the chute to fix the handle. This is not specifically limited herein.

Figure 8:
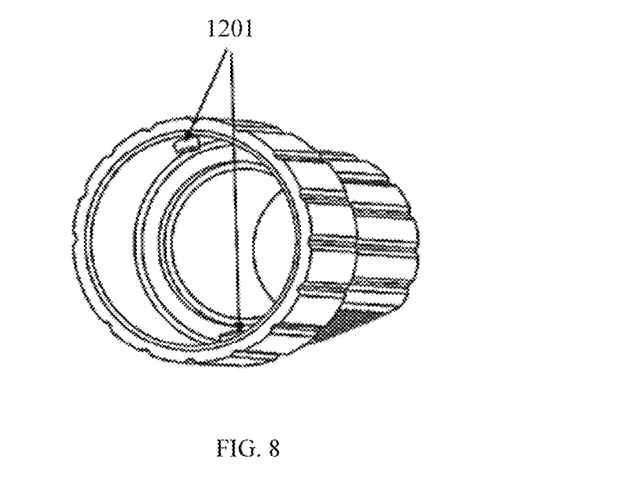
FIG. 8 is a schematic diagram of a locking structure on a handle according to this application.

Referring to FIG. 8, in an embodiment, a protruding locking structure 1201 is provided on an inner wall at an end that is of the handle 120 and that is away from the rear retainer 130. The locking structure 1201 may be a cylindrical bump, and there may be one or more locking structures 1201. This is not specifically limited herein.

Figure 9:
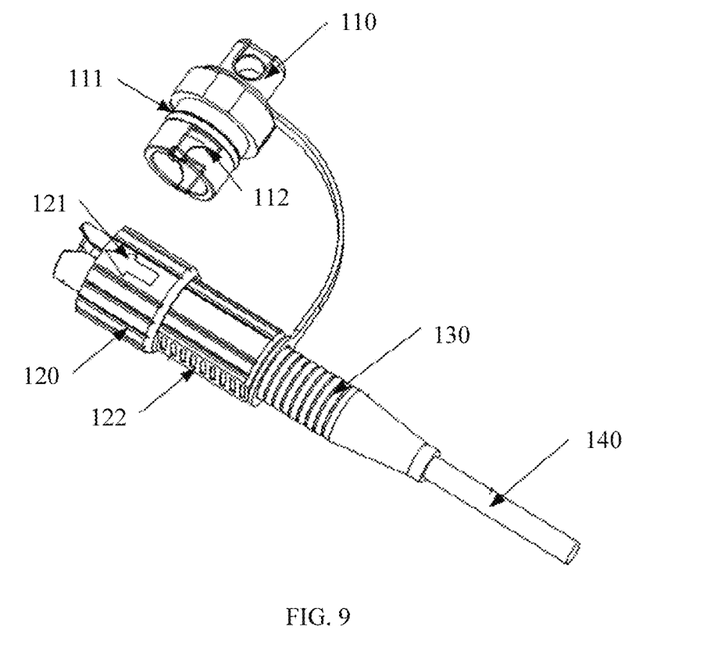
FIG. 9 is a schematic structural diagram of an optical fiber sub-assembly with a dustproof cap according to this application.

Referring to FIG. 9, in an embodiment, a dustproof cap 110 is fastened to the optical fiber sub-assembly 100 using a rope. The dustproof cap 110 is mainly intended to prevent dust and water and protect the FMC assembly 150 before the optical fiber sub-assembly 100 is inserted in the adapter 200. To achieve a good sealing effect when the dustproof cap 110 and the handle 120 are snapped-fitted, a dustproof cap sealing ring 111 is provided outside the dustproof cap 110. An accommodation cavity of the optical fiber sub-assembly 100 is provided at an end of the dustproof cap 110. The accommodation cavity extends along an axial direction of the dustproof cap 110, and can accommodate ends, connected to the outside, of the protection hood 170 and the FMC assembly 150 in the optical fiber sub-assembly 100. At least one locking groove 112 is provided on an outer surface of the dustproof cap 110. A quantity of locking grooves 112 is equal to a quantity of locking structures 1201 on the handle 120. The locking structure 1201 is configured to snap-fit the locking groove 112, such that the dustproof cap 110 is fixed to the handle 120.

In an embodiment, an indication identifier 121 is provided on an outer surface at the end that is of the handle 120 and that is away from the rear retainer 130, to indicate a connected state or a released state of the handle 120. Cutting planes 122 are provided on an outer surface at an end that is of the handle 120 and that is close to the rear retainer 130. When an operation is performed to fix the handle 120 to the dustproof cap 110, the cutting planes 122 may be clamped for performing a rotation operation, to prevent slipping. To further increase friction, anti-skid grooves may be further formed on the cutting planes 122 to improve a hand feel of performing an operation. It should be noted that the cutting planes 122 may be one pair of symmetric cutting planes, or may be a plurality of pairs of symmetric cutting planes, for example, two pairs or three pairs. This is not specifically limited herein.

Figure 10A:
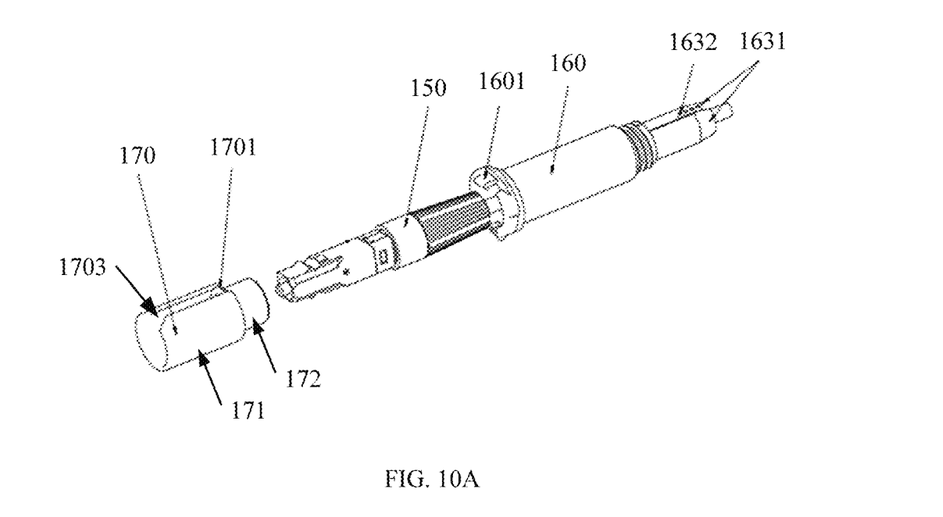
FIG. 10A is a schematic structural diagram in which a spindle is fixed to a protection hood using a snap clip according to this application.

Referring to FIG. 10A, in an embodiment, an opening 1703 is provided at an end that is of the protection hood 170 and that is away from the spindle 160, such that a cross section of the end that is of the protection hood 170 and that is away from the spindle 160 is C-shaped, that is, the protection hood 170 is a C-shaped hood with the opening 1703 on a peripheral surface.

Certainly, in another embodiment, there may be alternatively more than one opening 1703 on the peripheral surface of the protection hood 170. For example, two openings or three openings may be included. This is not specifically limited herein. The opening 1703 may be horn-shaped, that is, an end of the opening 1703 has an arc surface, which implements a guiding effect, helping guide insertion of the optical fiber sub-assembly 100 in the adapter 200.

In an embodiment, on a basis of protecting the FMC assembly 150, to prevent the protection hood 170 from moving along the axial direction of the spindle 160, the fixing sleeve 172 is inserted in the spindle 160, a first fixing structure 1601 is provided on an end face that is of the spindle and that is close to the protection hood 170, a second fixing structure 1701 is provided on an end face that is of the hood body 171 and that is close to the fixing sleeve 172, and the first fixing structure 1601 and the second fixing structure 1701 are buckled, such that the spindle 160 is fixedly connected to the protection hood 170. The spindle and the protection hood are fixedly connected through buckling, such that the optical fiber sub-assembly can be assembled and disassembled more conveniently. Compared with an optical fiber sub-assembly in which a spindle is connected to a protection hood in a threaded manner, this can greatly shorten a time of assembling and disassembling the optical fiber sub-assembly on site. Tests show that an assembly and disassembly time of the optical fiber sub-assembly provided in this embodiment is only ⅕ of an assembly and disassembly time of an optical fiber sub-assembly using a threaded connection.

It can be understood that, to insert the fixing sleeve 172 in the spindle 160 and conveniently dispose the second fixing structure 1701, an outer diameter of the fixing sleeve 172 is less than an outer diameter of the hood body 171. In addition, the first fixing structure 1601 may be provided at any location on an end face of the spindle 160, and the second fixing structure 1701 may be provided at any location on an end face of the hood body 171. Using a C-shaped hood as an example, the second fixing structure 1701 may be provided at a location that is on the end face of the hood body 171 and that corresponds to the opening 1703.

Figure 10B:
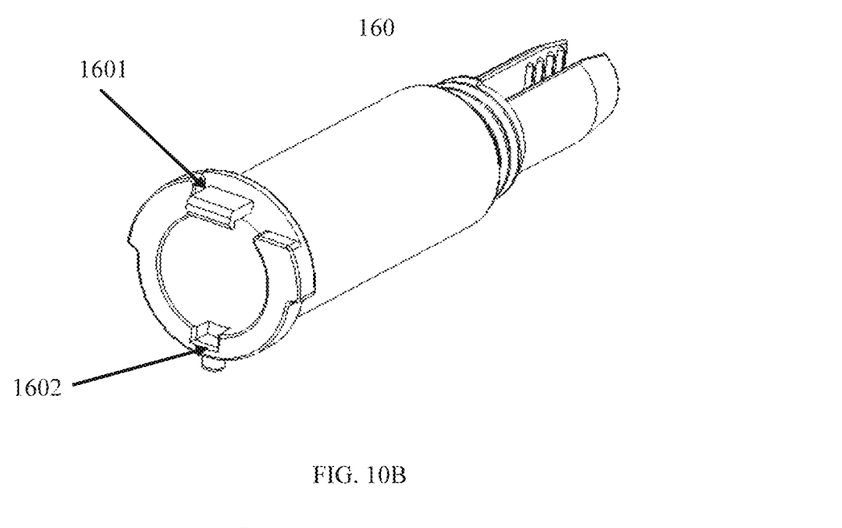
FIG. 10 is a schematic structural diagram of a locating slot on a spindle according to this application.
Figure 10C:
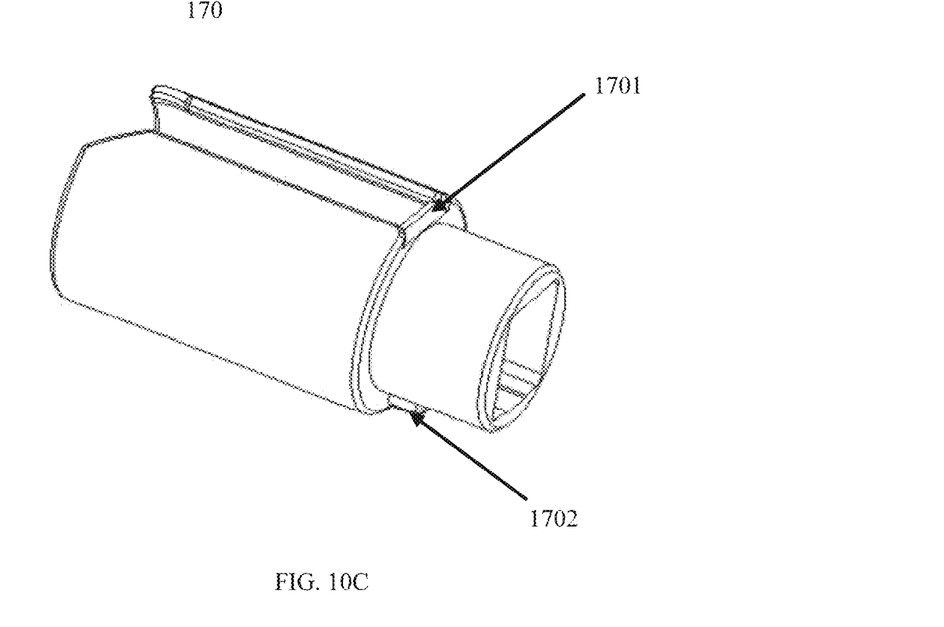
FIG. 10C is a schematic structural diagram of a locating key on a protection hood according to this application.

Referring to FIG. 10B and FIG. 10C, in an embodiment, to prevent the fixing sleeve 171 from rotating in the spindle 160 after the fixing sleeve 171 is inserted in the spindle 160, and further prevent the fixing sleeve 171 from sliding into the spindle 160, a locating slot 1602 is provided on an end face that is of the spindle 160 and that is close to the protection hood 170. Correspondingly, a locating key 1702 is provided on the end face that is of the hood body 171 and that is close to the fixing sleeve 172. The locating key 1702 may be inserted in the locating slot 1602. Certainly, alternatively, a locating key 1702 may be provided on the end face that is of the spindle 160 and that is close to the protection hood 170, and a locating slot 1602 may be provided on the end face that is of the hood body 171 and that is close to the fixing sleeve 172. In addition, there may be one or more groups of locating keys 1702 and locating slots 1602. This is not specifically limited herein.

The first fixing structure 1601 and the second fixing structure 1701 may be implemented in a plurality of manners. The manners are separately described below.

Referring to FIG. 10A, in an embodiment, the first fixing structure 1601 may be a snap clip, the second fixing structure 1701 may be a snap slot, and the snap clip and the snap slot are snap-fitted, such that the spindle 160 is fixed to the protection hood 170. Alternatively, the first fixing structure 1601 may be a snap slot, and the second fixing structure 1701 may be a snap clip. In addition, one or more groups of snap clips and corresponding snap slots may be provided. This is not specifically limited herein.

Figure 11:
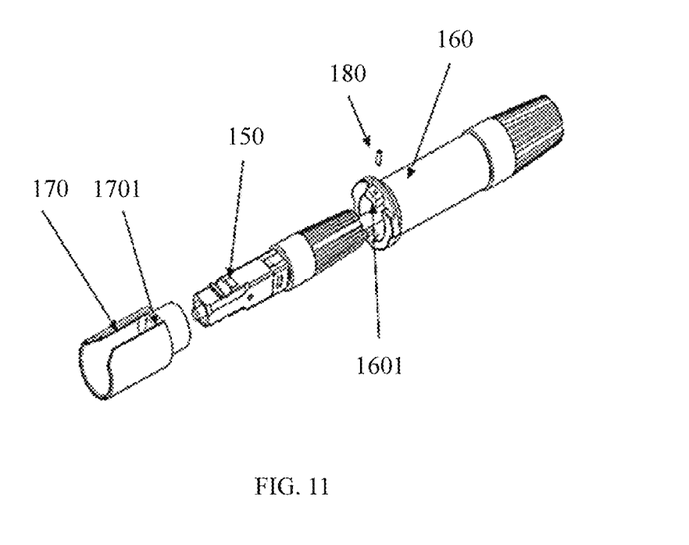
FIG. 11 is a schematic structural diagram in which a spindle is fixed to a protection hood using a pin according to this application.

Referring to FIG. 11, in an embodiment, the optical fiber sub-assembly 100 may further include a pin 180, the first fixing structure 1601 may be a first jack, the second fixing structure 1701 may be a second jack, and the pin 180 may be inserted in the first jack and the second jack, such that the first jack and the second jack are fixed. It can be understood that one or more groups of pins 180, first jacks, and second jacks may be provided. This is not specifically limited herein.

Figure 12:
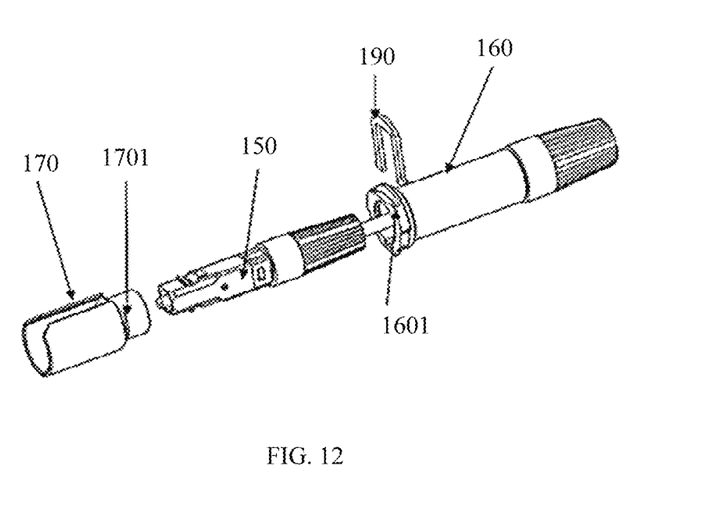
FIG. 12 is a schematic structural diagram in which a spindle is fixed to a protection hood using a snap spring according to this application.

Referring to FIG. 12, in an embodiment, the optical fiber sub-assembly may further include a snap spring 190, the first fixing structure 1601 may be a first groove, the second fixing structure 1701 may be a second groove, and the snap spring 190 may be inserted in the first groove and the second groove, such that the first groove and the second groove are fixed. It can be understood that one or more groups of snap springs 190, first grooves, and second grooves may be provided. This is not specifically limited herein.

In addition to the several manners listed above, the protection hood 170 may be alternatively fixed to the spindle 160 in another manner. For example, an end face that is of the spindle 160 and that faces the protection hood 170 may be bonded, using glue, to the end face that is of the hood body 171 and that is close to the fixing sleeve 172. This is not specifically limited herein.

The foregoing describes the optical fiber sub-assembly 100 in the embodiments of this application, and the following describes an optical fiber connector 10 in this application.

Figure 13:
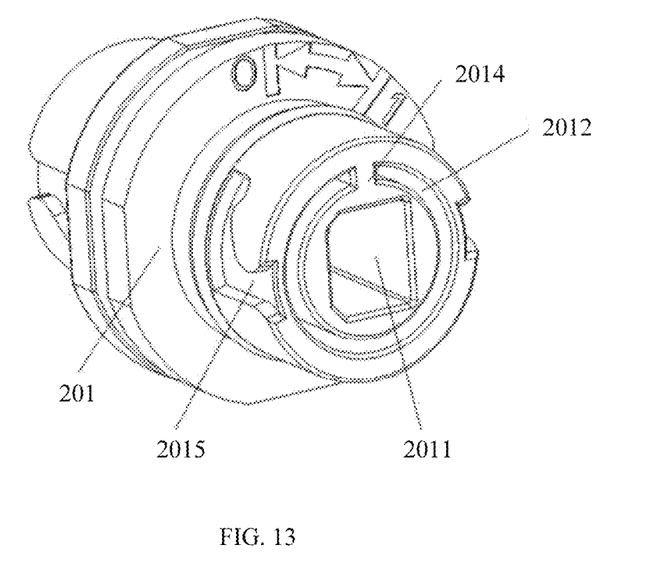
FIG. 13 is a schematic structural diagram of an adapter according to this application.

As shown in FIG. 2, in addition to the foregoing optical fiber sub-assembly 100, the optical fiber connector 10 further includes the adapter 200. Referring to FIG. 13, a socket 201 is provided at an end of the optical fiber adapter 200.

A cavity 2011 and a slot 2012 are provided on the socket 201. The cavity 2011 is located in the middle of the socket 201. The cavity 2011 and the slot 2012 extend along an axial direction of the socket 201. The slot 2012 surrounds a periphery of the cavity 2011. The FMC assembly 150 in the optical fiber sub-assembly 100 may be inserted in the cavity 2011. The protection hood 170 in the optical fiber sub-assembly 100 may be inserted in the slot 2012. If the protection hood 170 is a C-shaped hood, a strip-shaped bump 2014 that extends along the axial direction of the socket 201 may be further provided on the slot 2012, such that a cross section of the slot 2012 is C-shaped. A width of the strip-shaped bump 2014 is equivalent to that of an opening of the C-shaped hood. The slot 2012 may be seamlessly connected to the C-shaped hood, thereby implementing blind-mate of the optical fiber sub-assembly 100, facilitating operations, and further implementing plug-and-play of the optical fiber connector 10.

In an embodiment, a second chute 2015 is provided on a periphery of the optical fiber socket 201. The chute 2015 is spiral. The chute 2015 extends from an end of the socket 201 along a circumferential direction of the socket 201, and an extension end of the chute 2015 is buckled to the locking structure 1201 on the handle 120. An arrow identifier and identifiers "0" and "1" are provided on an outer surface of the optical fiber socket 201. When the optical fiber sub-assembly 100 is inserted in the optical fiber socket 201, the indication identifier 121 on the handle 120 should be aligned with the arrow identifier of the socket 201. When the optical fiber sub-assembly 100 is rotated in a direction toward "0", the optical fiber sub-assembly 100 is in a locked state. When the optical fiber sub-assembly 100 is rotated in a direction toward "1", the optical fiber sub-assembly 100 is in a released state. In this implementation, the chute 2015 may have a same shape as a shape of the locking groove 112 on the dustproof cap 110.

Figure 14:
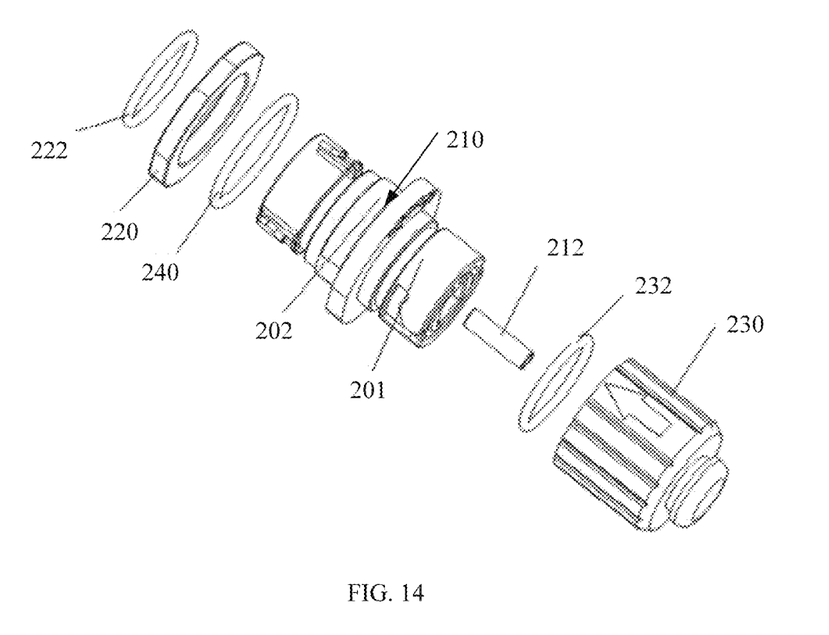
FIG. 14 is an exploded view of an adapter according to this application.

Referring to an exploded view of the adapter 200 in FIG. 14, in an embodiment, the optical fiber adapter 200 includes an O-shaped sealing ring 222, a locking nut 220, an O-shaped sealing ring 240, a socket body 210, and a ceramic sleeve 212. The O-shaped sealing ring 240, the locking nut 220, and the O-shaped sealing ring 222 are sequentially sleeved outside the socket body 210. The ceramic sleeve 212 is inserted in the other end of the socket body 210, and is fastened using the O-shaped sealing ring 222. The socket 201 is provided at an end of the socket body 210, and a socket 202 is provided at the other end of the socket body 210. The socket 201, the socket 202, and the ceramic sleeve 212 placed in the middle of the socket body 210 may be welded together using an ultrasonic wave.

In an embodiment, the optical fiber adapter 200 includes an adapter dustproof cap 230. An adapter accommodation cavity for accommodating the optical fiber adapter 200 is provided at an end of the adapter dustproof cap 230. The accommodation cavity is configured to accommodate the socket 201 when the optical fiber adapter 200 is inserted in the adapter dustproof cap 230.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical fiber sub-assembly, comprising:
an optical cable;
a field-mountable connector (FMC) assembly connected to an end of the optical cable, wherein the optical cable protrudes from a first end of the FMC assembly, and wherein the FMC assembly comprises a ferrule disposed at a second end of the FMC assembly;
a spindle sleeved outside of the first end of the FMC assembly;
a protection hood sleeved outside of the second end of the FMC assembly, wherein the protection hood is fixedly connected to the spindle, wherein the protection hood comprises a hood body and a fixing sleeve formed by extending an end of the hood body, and wherein the fixing sleeve is inserted in the spindle;
a rear retainer connected to an end of the spindle that is away from the protection hood, wherein the end of the spindle is configured to fasten the optical cable; and
a handle sleeved outside of the protection hood and the spindle.

2. The optical fiber sub-assembly according to claim 1, wherein the FMC assembly penetrates the fixing sleeve and the hood body, and wherein the hood body is sleeved outside of the ferrule.

3. The optical fiber sub-assembly according to claim 1, wherein an inner wall at the end of the spindle has a shaft shoulder, and wherein the first end of the FMC assembly presses against the shaft shoulder.

4. The optical fiber sub-assembly according to claim 1, wherein the end of the spindle comprises a fixed portion and a crimping structure formed by extending an end face of the fixed portion, wherein the fixed portion and the crimping structure are sleeved outside of the optical cable, wherein an outer wall of the fixed portion has an outer screw thread, wherein an inner wall of the rear retainer includes an inner screw thread, wherein the rear retainer is sleeved outside of the fixed portion and the crimping structure, and wherein the inner screw thread on the rear retainer is screwed to the outer screw thread on the fixed portion, such that the crimping structure fastens the optical cable.

5. The optical fiber sub-assembly according to claim 4, wherein the crimping structure comprises at least two cantilevers, wherein fixed ends of the at least two cantilevers are connected to the fixed portion, wherein bump structures are formed on inner walls of movable ends of the at least two cantilevers, and wherein the movable ends of the at least two cantilevers are configured to tightly press the optical cable.

6. The optical fiber sub-assembly according to claim 2, wherein an outer diameter of the fixing sleeve is less than an outer diameter of the hood body.

7. The optical fiber sub-assembly according to claim 1, further comprising:
a first fixing structure provided on the spindle; and
a second fixing structure provided on the protection hood, wherein the first fixing structure and the second fixing structure are fixedly connected through buckling.

8. The optical fiber sub-assembly according to claim 7, wherein:
the first fixing structure is a snap clip and the second fixing structure is a snap slot; or
the first fixing structure is the snap slot and the second fixing structure is the snap clip.

9. The optical fiber sub-assembly according to claim 8, wherein the first fixing structure is the snap clip and is provided on an end face of the spindle that faces the protection hood, wherein the second fixing structure is the snap slot and is provided on the end of the hood body, and wherein the end of the hood body is close to the fixing sleeve.

10. The optical fiber sub-assembly according to claim 7, further comprising a pin, wherein the first fixing structure is a first jack, wherein the second fixing structure is a second jack, and wherein the pin is configured to be inserted in the first jack and the second jack.

11. The optical fiber sub-assembly according to claim 7, further comprising a snap spring, wherein the first fixing structure is a first groove, wherein the second fixing structure is a second groove, and wherein the snap spring is configured to be inserted in the first groove and the second groove.

12. The optical fiber sub-assembly according to claim 2, wherein an end face of the spindle faces the protection hood and is bonded, using glue, to an end face of the hood body that is close to the fixing sleeve.

13. The optical fiber sub-assembly according to claim 2, further comprising:
a locating slot; and
a locating key inserted in the locating slot,
wherein the locating key is provided on an end face of the spindle and the locating slot is provided on an end face of the hood body, or the locating slot is provided on the end face of the spindle and the locating key is provided on the end face of the hood body, and
wherein the end face of the spindle faces the protection hood and the end face of the hood body is close to the fixing sleeve.

14. The optical fiber sub-assembly according to claim 2, wherein an inner cavity of the fixing sleeve matches the FMC assembly to prevent the fixing sleeve from rotating relative to the FMC assembly.

15. The optical fiber sub-assembly according to claim 1, further comprising an opening provided at an end of the protection hood that is away from the spindle, such that a cross section of the end of the protection hood is C-shaped.

16. The optical fiber sub-assembly according to claim 1, further comprising:
- an optical cable sealing ring provided outside another end of the optical cable that is close to the FMC assembly; and
- a spindle sealing ring provided outside another end of the spindle that is close to the protection hood.

17. An optical fiber connector, comprising:
an optical fiber sub-assembly comprising:
- an optical cable;
- a field mountable connector (FMC) assembly connected to an end of the optical cable, wherein the optical cable protrudes from a first end of the FMC assembly, and wherein the FMC assembly comprises a ferrule disposed at a second end of the FMC assembly;
- a spindle sleeved outside of the first end of the FMC assembly;
- a protection hood sleeved outside of the second end of the FMC assembly, wherein the protection hood is fixedly connected to the spindle, wherein the protection hood comprises a hood body and a fixing sleeve formed by extending an end of the hood body, and wherein the fixing sleeve is inserted in the spindle;
- a rear retainer connected to an end of the spindle that is away from the protection hood, wherein the end of the spindle is configured to fasten the optical cable; and
- a handle sleeved outside of the protection hood and the spindle; and
an adapter configured to connect to the optical fiber sub-assembly, wherein a cavity and a slot surrounding the cavity are provided at an end of the adapter,
wherein the second end of the FMC assembly is inserted in the cavity of the adapter, and
wherein the protection hood of the optical fiber sub-assembly is inserted in the slot of the adapter.

18. The optical fiber connector according to claim 17, wherein the FMC assembly penetrates the fixing sleeve and the hood body, and wherein the hood body is sleeved outside of the ferrule.

19. The optical fiber connector according to claim 17, wherein an inner wall at the end of the spindle has a shaft shoulder, and wherein the first end of the FMC assembly presses against the shaft shoulder.

20. The optical fiber connector according to claim 17, wherein the end of the spindle comprises a fixed portion and a crimping structure formed by extending an end face of the fixed portion, wherein the fixed portion and the crimping structure are sleeved outside of the optical cable, wherein an outer wall of the fixed portion has an outer screw thread, wherein an inner wall of the rear retainer includes an inner screw thread, wherein the rear retainer is sleeved outside of the fixed portion and the crimping structure, and wherein the inner screw thread on the rear retainer is screwed to the outer screw thread on the fixed portion, such that the crimping structure fastens the optical cable.

\* \* \* \* \*